(12) United States Patent
Tsuzuki et al.

(10) Patent No.: US 11,060,898 B2
(45) Date of Patent: Jul. 13, 2021

(54) FLOWMETER HAVING A LEAK PREVENTION ARRANGEMENT FROM A GAP BETWEEN THE OUTER CASE AND THE INNER CASE

(71) Applicant: AICHI TOKEI DENKI CO., LTD., Nagoya (JP)

(72) Inventors: Gengo Tsuzuki, Nagoya (JP); Tatsuki Inaba, Nagoya (JP)

(73) Assignee: AICHI TOKEI DENKI CO., LTD., Nagoya (JP)

( * ) Notice: Subject to any disclaimer, the term of this patent is extended or adjusted under 35 U.S.C. 154(b) by 214 days.

(21) Appl. No.: 16/340,344

(22) PCT Filed: Oct. 20, 2016

(86) PCT No.: PCT/JP2016/081084
§ 371 (c)(1),
(2) Date: Apr. 8, 2019

(87) PCT Pub. No.: WO2018/073933
PCT Pub. Date: Apr. 26, 2018

(65) Prior Publication Data
US 2019/0226897 A1   Jul. 25, 2019

(51) Int. Cl.
*G01F 15/14* (2006.01)
*G01F 1/00* (2006.01)
*G01F 1/06* (2006.01)

(52) U.S. Cl.
CPC .............. *G01F 15/14* (2013.01); *G01F 1/00* (2013.01); *G01F 1/06* (2013.01)

(58) Field of Classification Search
None
See application file for complete search history.

(56) References Cited

U.S. PATENT DOCUMENTS

| 4,389,902 A | * | 6/1983 | Kataoka | G01F 1/075 |
| | | | | 250/231.14 |
| 4,512,201 A | * | 4/1985 | Konrad | G01F 1/06 |
| | | | | 73/861.79 |

(Continued)

FOREIGN PATENT DOCUMENTS

| CN | 102844596 A | 12/2012 |
| JP | H11-304551 A | 11/1999 |

(Continued)

OTHER PUBLICATIONS

Jun. 23, 2020 Office Action issued in Japanese Patent Application No. 2018-546105.

(Continued)

*Primary Examiner* — Harshad R Patel
(74) *Attorney, Agent, or Firm* — Oliff PLC

(57) ABSTRACT

A flowmeter having a seal structure for preventing an inner case structure from becoming complicated and making it possible to easily assemble an inner case with an outer case even if an inflow port has a large diameter. A seal member including a pair of sheet members each having a circular opening provided in a central part and a protruding ring formed along the outer peripheral edge of the opening in a protruding shape that projects outward is inserted between the inner peripheral surface of a body case of an outer case and the outer peripheral surface of an inner case. The protruding rings of the seal member are pressed by the inner peripheral surface of the body case of the outer case, seal the space between the outer case body part and the inner case, and prevent the leakage of fluid flowing through a flowmeter.

9 Claims, 9 Drawing Sheets

(56) References Cited

U.S. PATENT DOCUMENTS

| | | | | |
|---|---|---|---|---|
| 8,387,454 B2* | 3/2013 | Margalit | ............... | G01F 1/06 |
| | | | | 73/273 |
| 8,876,116 B2 | 11/2014 | Hattori et al. | | |
| 2013/0043660 A1* | 2/2013 | Daub | ............... | H01M 2/1077 |
| | | | | 277/500 |
| 2014/0035237 A1 | 2/2014 | Hattori et al. | | |

FOREIGN PATENT DOCUMENTS

| | | |
|---|---|---|
| JP | 2011-038980 A | 2/2011 |
| JP | 2014-095611 A | 5/2014 |

OTHER PUBLICATIONS

Apr. 23, 2019 International Preliminary Report on Patentability issued in International Patent Application No. PCT/JP2016/081084.
Apr. 17, 2020 extended Search Report issued in European Patent Application No. 16919201.0.
May 6, 2020 Office Action issued in Chinese Patent Application No. 201680089894.3.
Jan. 24, 2017 International Search Report issued in International Patent Application No. PCT/JP2016/081084.

* cited by examiner

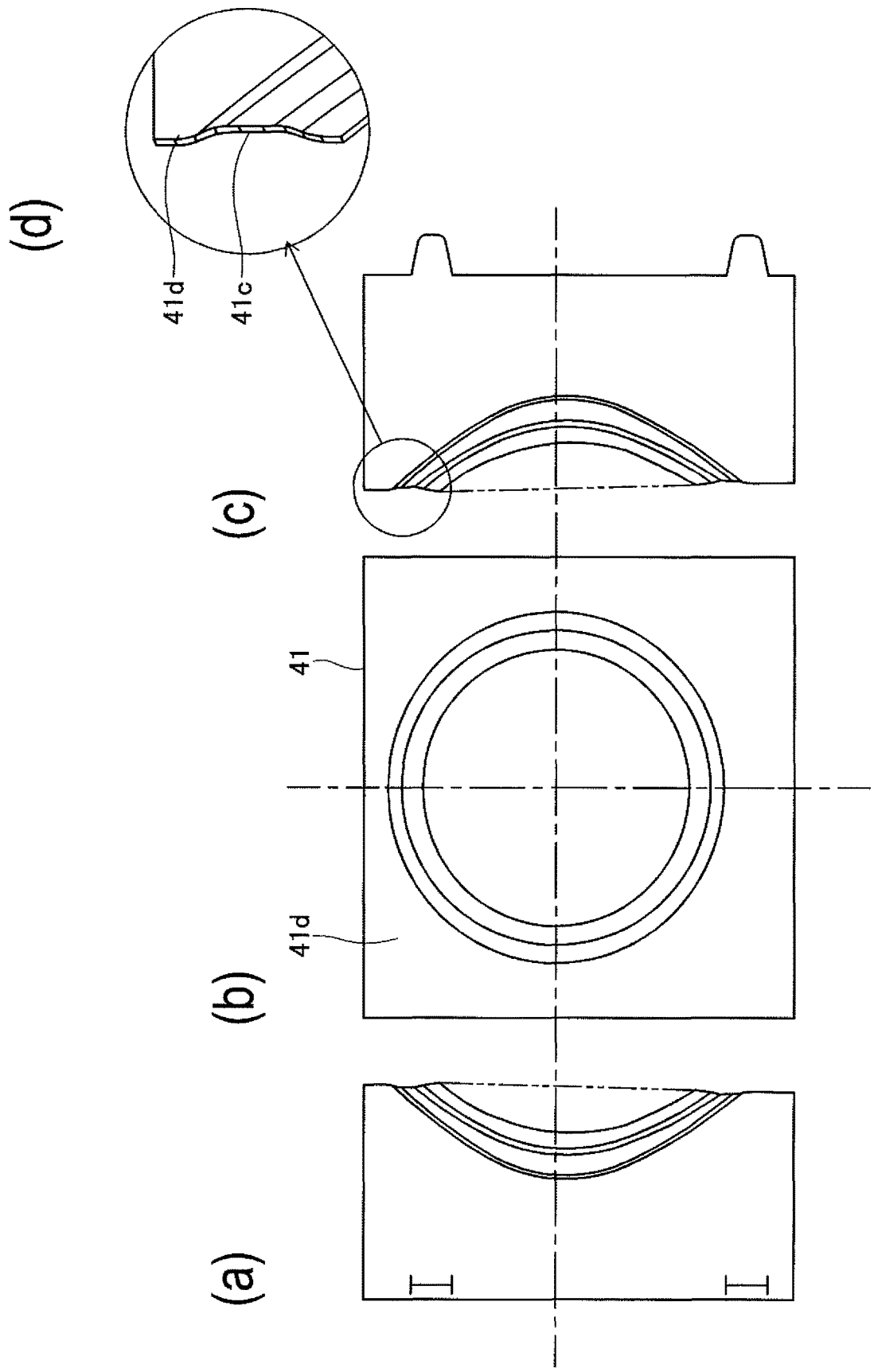

FLOWMETER HAVING A LEAK PREVENTION ARRANGEMENT FROM A GAP BETWEEN THE OUTER CASE AND THE INNER CASE

FIELD

The present invention relates to a flowmeter for measuring a flow rate of fluid such as liquid or gas.

BACKGROUND

Conventionally, a flowmeter including various seal structures has been suggested in order to prevent fluid from leaking from a gap between an outer case and an inner case having a sensor part for measuring a flow rate.

The Patent Document 1 discloses a water meter provided with a lip seal at an inflow opening part of an inner case and whose tip part of a lip-shaped seal part is formed into a substantial conical shape reducing in diameter, wherein the seal part of the lip seal pressure-contacts an outer circumference of an inflow port on an inner peripheral surface of the outer case into which the inner case is fitted, preventing a leakage of water.

CITATION LIST

Patent Document

[Patent document 1] Japanese Laid-open Patent Publication No. H11-304551

SUMMARY OF THE INVENTION

The object and advantages of the invention will be realized and attained by means of the elements and combinations particularly pointed out in the claims.

It is to be understood that both the forgoing general description and the following detailed description are exemplary and explanatory and are not restrictive of the invention.

Means for Solving the Problems

The following description is the list of aspects of the embodiment(s) of the present application.

A flowmeter according to the first aspect of the present invention made to solve the above-mentioned problem is the flowmeter comprising: an outer case; an inner case loosely fitted into the outer case; and a seal member to be inserted between the outer case and the inner case, the seal member including: an opening part located in a flow path passing through the outer case and the inner case; and a protruding ring part or a recessed ring part respectively formed into a protruded shape or a recessed shape from a side wall surface of the seal member and enclosing the opening part in an outer periphery of the opening part, and wherein a communicating part of the outer case and the inner case in the flow path is sealed when the protruding ring part or the recessed ring part of the seal member is interposed and pressed between the outer case and the inner case in a state where the inner case is assembled into the outer case via the seal member.

The flowmeter according to the second aspect of the present invention is the flowmeter according to the first aspect, wherein the outer case comprises an open end serving as an insertion port of the inner case at one end; and an opening communicating the flow path with the inner case on a side wall, wherein an inner side surface of the outer case is inclined inside from the open end toward an insertion direction of the inner case, wherein the inner case comprises a penetration pipe forming the flow path by communicating with the opening of the outer case and passing through a side part of the inner case, and wherein an outer side surface of the inner case is inclined inside from an insertion rear end toward an insertion tip with respect to the outer case at substantially the same angle as an inclination provided on the inner side surface of the outer case.

The flowmeter according to the third aspect of the present invention is the flowmeter according to the first aspect or the second aspect, wherein the seal member is formed by a pair of sheet members divided for the each opening part.

The flowmeter according to the fourth aspect of the present invention is the flowmeter according to the third aspect, wherein each of the pair of sheet members is provided with a claw part protruding outside at one side end part and a cut into which the claw part is inserted at the other side end part, and wherein the claw part and the cut provided at one of the pair of sheet members are respectively inserted into the cut and the claw part provided at the other of the pair of sheet members to form the seal member.

The flowmeter according to the fifth aspect of the present invention is the flowmeter according to any one of the first to fourth aspects, wherein an upper end of the seal member and upper ends of the outer case and the inner case are located at substantially the same position in a state where the inner case is assembled into the outer case via the seal member.

The flowmeter according to the sixth aspect of the present invention is the flowmeter according to any one of the first to fifth aspects, comprising a positioning mark provided at upper end parts of the outer case, the inner case, and the seal member to position the flow path and the opening part of the seal member when the inner case is assembled into the outer case via the seal member.

The flowmeter according to the seventh aspect of the present invention is the flowmeter according to any one of the first to sixth aspects, wherein the seal member is a sheet made of a resin, and the protruding ring part or the recessed ring part is formed by embossing.

Effects of the Invention

The flow path passing through the outer case and the inner case is formed in the flowmeter according to the first aspect, and the opening part is provided in the seal member interposed between the outer case and the inner case. The protruding ring part enclosing the opening part and formed into a protruded shape from the side wall surface or the recessed ring part enclosing the opening part and formed into a recessed shape is provided at the outer periphery of the opening part of the seal member. Thus, the communicating part of the outer case and the inner case in the flow path can be sealed when the protruding ring part or the recessed ring part of the seal member is interposed and pressed between the outer case and the inner case in a state where the inner case is assembled into the outer case via the seal member. That is, since it is not necessary to form a structure for positioning the seal member such as the inner case disclosed in the Patent Document 1 for the inner case, the inner case can be formed with a simple structure, reducing the manufacturing costs. Also, since the communicating part of the outer case and the inner case is sealed when the protruding ring part or the recessed ring part of the seal member is sandwiched and pressed between the outer case and the inner case, it is not necessary to crush and deform the lip-shaped seal part of the lip seal at the time of sealing as described in the Patent Document 1. Accordingly, the flowmeter can be easily assembled even if the opening part where fluid such as gas or liquid flows becomes larger.

In the flowmeter according to the second aspect, the inner side surface of the outer case is inclined inside from the open end toward the insertion direction of the inner case, and the outer side surface of the inner case inserted from the open end of the outer case is also inclined inside from the insertion rear end toward the insertion tip at substantially the same angle as the inclination provided on the inner surface of the outer case. Thus, the inner case can easily insert into the outer case from the open end of the outer case. Also, since the inner case can be easily taken out from the outer case for exchange of the seal member etc., the operability can be improved during maintenance.

In the flowmeter according to the third aspect, the seal member is composed of the pair of sheet members divided for each opening part. Thus, since a die for forming the sheet member can be downsized, the manufacturing cost of the seal member can be reduced.

In the flowmeter according to the fourth aspect, each of the pair of sheet members is provided with the claw part protruding outside at one side end part and a cut into which the claw part is inserted at the other side end part. The pair of sheet members can be integrated by inserting the claw part and the cut provided at the one of the pair of sheet members into the cut and the claw part provided at the other, respectively. Thus, the seal member can be easily assembled. Also, since the seal member can be easily taken out from the flowmeter for exchange of the seal member etc., the operability can be improved during maintenance.

In the flowmeter according to the fifth aspect, since the upper end of the seal member and the upper ends of the outer case and the inner case are located at substantially the same position in a state where the inner case is assembled into the outer case via the seal member, it is possible to visually confirm whether the seal member is appropriately inserted. Thus, occurrence of failure in assembling work can be prevented.

In the flowmeter according to the sixth aspect, since the flow path passing through the outer case and the inner case and the opening part of the seal member can be easily and accurately positioned and assembled by assembly with the positioning marks at the upper end parts of the outer case, the inner case, and the seal member corresponded to each other, the operability can be improved.

In the flowmeter according to the seventh aspect, the seal member is formed by molding the sheet made of a resin into the protruding ring part or the recessed ring part by embossing. Accordingly, even if the protruding ring part or the recessed ring part has a complicated shape, the protruding ring part or the recessed ring part can be easily formed, and thus the seal member can be manufactured at a low cost.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

BRIEF DESCRIPTION OF THE DRAWINGS

FIG. 9 is a four-view detailed drawing illustrating the sheet member of the flowmeter according to the embodiment of the present invention; i.e. (a) a left side view, (b) a front view, and (c) a right side view, and (d) a partly enlarged view.

DESCRIPTION OF THE EMBODIMENTS

Problems to be Solved by the Invention

Since a part deformed by press fitting is small if an inflow port of a water meter employing the lip seal disclosed in the general state of art has a small diameter, it is possible to assemble an inner case into an outer case by pressure-contacting a seal part of a lip seal by manpower. However, in case where the inflow port has a large diameter, a part deformed by press fitting becomes large, causing a problem that it becomes difficult to assemble an inner case into an outer case by pressure-contacting a seal part of a lip seal.

Also, it is necessary to create a structure for the inner case, in which a lip seal is held at an inflow opening part of the inner case, causing a problem that the structure of the inner case tends to become complicated.

The present embodiment is made in the context of circumstances above, and an object thereof is to provide a flowmeter having a seal structure in which an inner case can be easily assembled into an outer case while suppressing complication of a structure of the inner case, even if an inflow port has a large diameter.

Hereinafter, a flowmeter 1 according to the embodiment of the present invention will be described with reference to the drawings.

Figure 1:
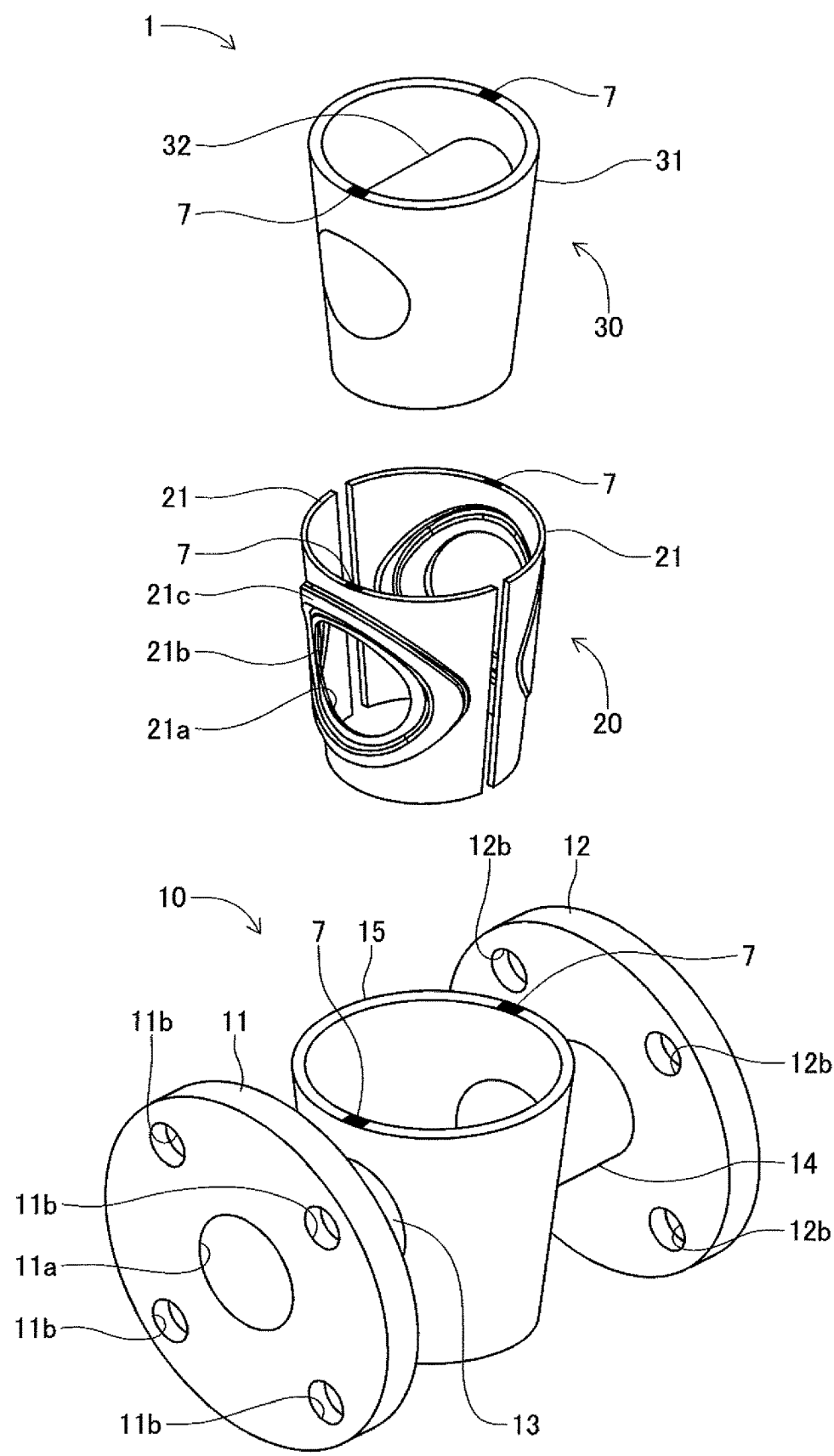
FIG. 1 is an exploded perspective view of a flowmeter according to the embodiment of the present invention.

FIG. 1 is an exploded perspective view of the flowmeter 1 according to one embodiment of the present invention. As illustrated in FIG. 1, the flowmeter 1 is composed of an outer case 10, an inner case 30 gently facing the outer case 10 with a seal member 20 interposed and loosely fitted between the inner case 30 and an inner peripheral surface of the outer case 10, and the seal member 20 disposed between the outer case 10 and the inner case 30. Loosely fitting and gently facing is a state where the outer case 10 and the inner case 30 press the seal member 20 to the degree that the seal member 20 disposed between the outer case 10 and the inner case 30 brings out a seal effect. The outer case 10 and the inner case 30 are in a state where they are not necessarily adhered to each other with the seal member 20 interposed therebetween. In the embodiment, a structure of a seal member generally used for a flowmeter will be described as a seal member 20 of the flowmeter 1. The seal member 20 according to the present embodiment can be applicable to flowmeters using different principles such as an electromagnetic flowmeter, an ultrasonic flowmeter, and a hot-wire flowmeter, and the type of the flowmeter to which the seal member is applied is not limited. Accordingly, a sensor and an electrode etc. necessary to measure a flow rate are not illustrated in the below description. For example, in case where the flowmeter 1 is an electromagnetic flowmeter, an electrode and a sensor etc. are disposed inside or outside the outer case 10 and the inner case 30, which is not illustrated herein for the above reason.

Figure 2A:
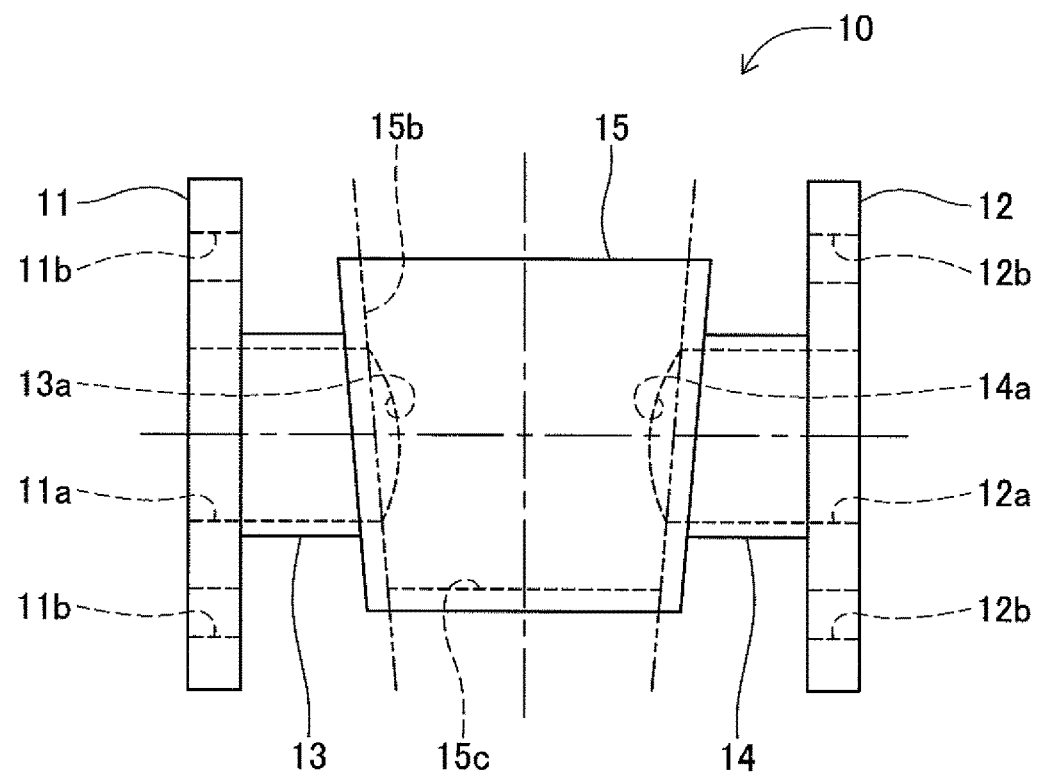
FIG. 2(A) is a front view of an outer case of the flowmeter according to the embodiment of the present invention.
Figure 2B:
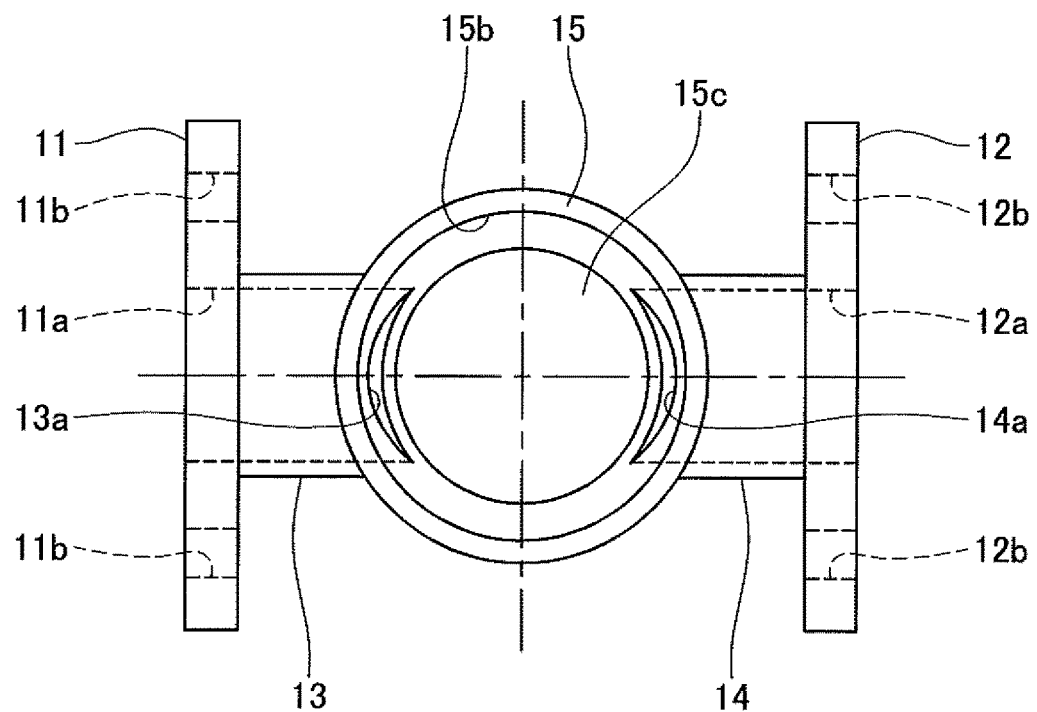
FIG. 2(B) is a plan view of the outer case of the flowmeter according to the embodiment of the present invention.

FIG. 2(A) is a front view of the outer case 10, and FIG. 2(B) is a plan view of the outer case 10 seen from the above. The outer case 10 includes a flange for inflow port 11 provided in a peripheral edge of an inflow opening part 11a into which fluid such as gas or liquid flow, a flange for outflow port 12 provided in a peripheral edge of an outflow opening part 12a serving as an outlet of fluid, and an outer case body part 15 into which the inner case 30 is loosely fitted and housed. In addition, an inflow opening part 13a and an outflow opening part 14a facing the inflow opening part 11a and the outflow opening part 12a are respectively provided in the outer case body part 15, and the outer case body part 15 is provided with a connection pipe 13 connecting between the inflow opening part 11a opened in the flange for inflow port 11 and the inflow opening part 13a of the outer case body part 15, the connection pipe 13 through which fluid flown from the inflow opening part 11a flows; and a connection pipe 14 connecting between the outflow opening part 14a of the outer case body part 15 and the outflow opening part 12a opened in the flange for outflow port 12, the connection pipe 14 through which fluid flows to the outflow opening part 12a.

The flange for inflow port 11 and the flange for outflow port 12 are flanges formed into a disk shape to connect the flowmeter 1 to the other piping or device etc., and the inflow opening part 11a serving as an inflow port and the outflow opening part 12a serving as an outflow port are opened at each of the central parts of the flange for inflow port 11 and the flange for outflow port 12. Also, four through holes 11b for connection and four through holes 12b for connection are respectively provided in outer peripheral ends of the flange for inflow port 11 and the flange for outflow port 12. Opening diameters of the inflow opening part 11a and the outflow opening part 12a and pipe inner diameters of the connection pipe 13 and the connection pipe 14 are formed so as to have substantially the same diameter so that the flow rate and the flow velocity in the flowmeter 1 become constant.

An inner peripheral surface 15b of the outer case body part 15 is formed into a reverse conical trapezoid in which a diameter of a bottom part 15c is slightly smaller than a diameter of an open end at an upper end part in order to facilitate taking in/out of the inner case 30 into/from the outer case body part 15, and thus the inner peripheral surface 15b of the outer case body part 15 is formed into a surface inclined inside toward the insertion direction of the inner case 30.

Figure 3A:
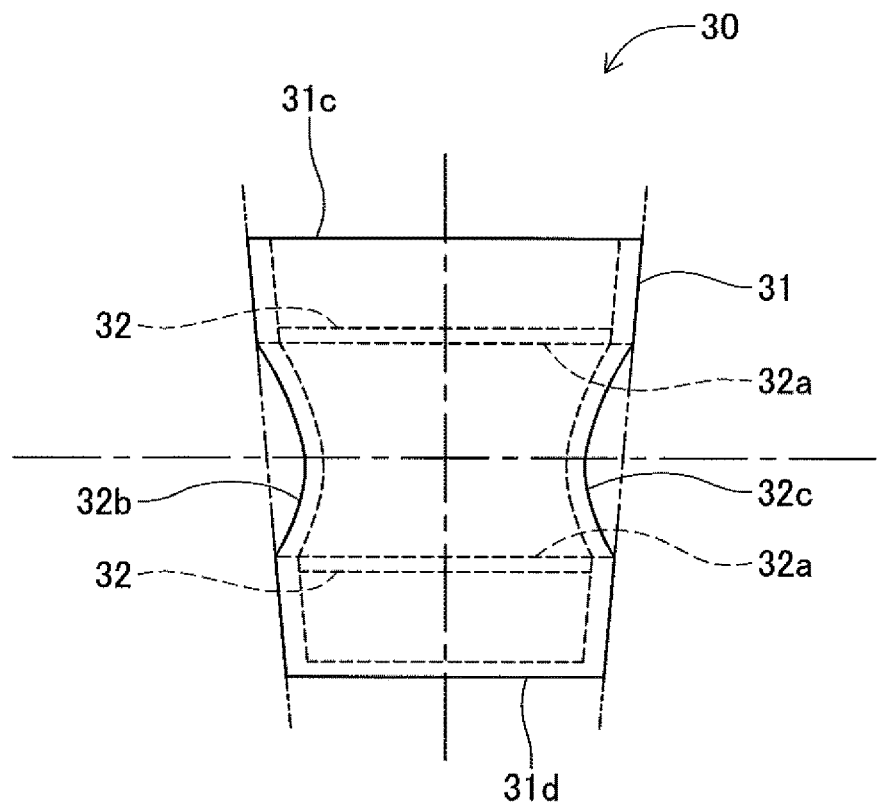
FIG. 3(A) is a front view of an inner case of the flowmeter according to the embodiment of the present invention.
Figure 3B:
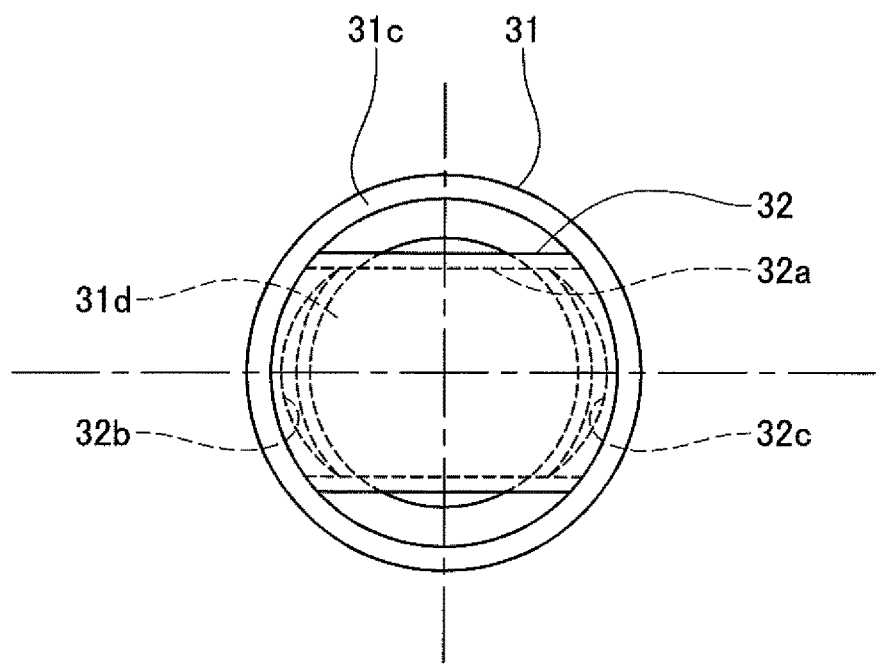
FIG. 3(B) is a plan view of an inner case of the flowmeter according to the embodiment of the present invention.

FIG. 3(A) is a front view of the inner case 30, and FIG. 3(B) is a plan view of the inner case 30 seen from the above. The inner case 30 is formed by an inner case body part 31 and a penetration pipe 32 located at the central part of the inner case body part 31 and passing through in the horizontal direction. The inner case 30 also includes a measuring part having a sensor and an electrode etc. (not shown) to measure the flow rate of fluid flowing through the penetration pipe 32. The inner case body part 31 is formed into a reverse conical trapezoid shape in which a diameter of a bottom part 31d is slightly smaller than a diameter of an upper end part 31c to be loosely fitted into the inner peripheral surface 15b of the outer case body part 15 as in the case with the inner peripheral surface 15b of the outer case body part 15. An outer peripheral surface of the inner case body part 31 having the reverse conical trapezoid has an inclination at substantially the same angle as an inclination provided on the inner peripheral surface 15b of the outer case body part 15. Thus, when the inner case body part 31 is inserted from the open end of the outer case body part 15, the outer peripheral surface of the inner case body part 31 is smoothly inserted along the inner peripheral surface 15b of the outer case body part 15 formed into the reverse conical trapezoid shape having an inclination surface at substantially the same angle as the outer peripheral surface of the inner case body part 31. A diameter of an inner peripheral surface 32a of the penetration pipe 32 is formed so as to have substantially the same diameter as the diameter of the inflow opening part 11a, the pipe inner diameters of the connection pipes 13, 14, and the diameter of the outflow opening part 12a so that the flow rate in the flowmeter 1 becomes constant. The penetration pipe 32 is provided in the inner case body part 31 so that an inflow opening part 32b and an outflow opening part 32c of the penetration pipe 32 are arranged on a straight line at substantially the same diameter and at substantially the same position as the inflow opening part 11a, the pipe inner diameters of the connection pipes 13, 14, and the outflow opening part 12a in the outer case 10 in a state where the inner case 30 is assembled into the outer case body part 15. That is, fluid flowing in from the inflow opening part 11a of the outer case 10 flows from the connection pipe 13 to the penetration pipe 32 of the inner case 30, and flows out from the outflow opening part 12a of the outer case 10 through the connection pipe 14. Since a caliber of the flow path from the inflow opening part 11a of the outer case 10 to the outflow opening part 12a of the outer case 10 is substantially the same and the openings of the inflow opening part 11a and the outflow opening part 12a are arranged on a straight line and at the same position, the flow rate and the flow velocity of fluid flowing through the flowmeter 1 becomes constant, and thus the flow rate can be accurately measured.

Figure 4:
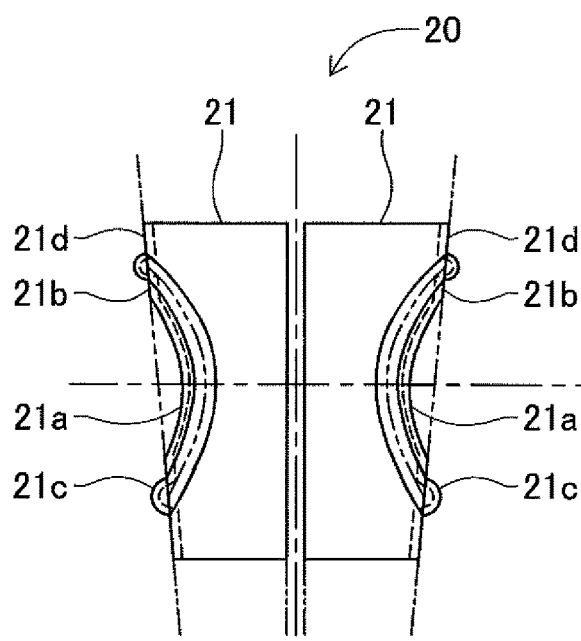
FIG. 4 is a three-view drawing illustrating the seal member of the flowmeter according to the embodiment of the present invention; i.e. (a) a front view, (b) a plan view, and (c) a right side view seen from direction of an opening part.
Figure 4:
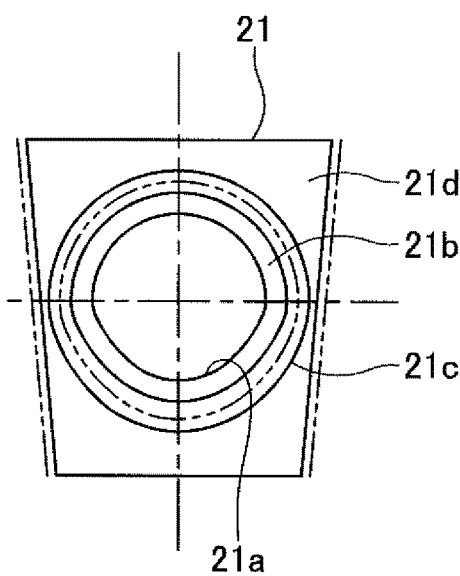
Figure 4:
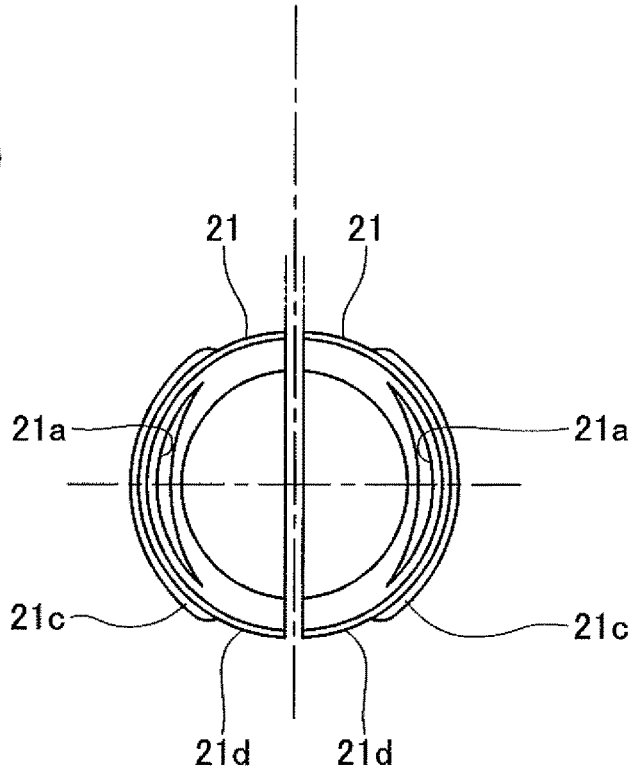

FIG. 4(a) is a front view of the seal member 20, FIG. 4(b) is a plan view of the seal member 20 seen from the above, and FIG. 4(c) is a right side view of the seal member 20 seen from the opening part 21a side. The seal member 20 is formed by a pair of sheet members 21. In the present embodiment, a thin polypropylene (PP) sheet (for example, the thickness is about 0.3 mm in the present embodiment) is employed for the sheet member 21. Since polypropylene has a small coefficient of friction, polypropylene smoothly slides between the inner peripheral surface 15b of the outer case body part 15 and the outer peripheral surface of the inner case body part 31, and moreover the polypropylene is elastic. Thus, as described below, polypropylene can be easily formed by embossing, and the polypropylene is easily assembled and has an excellent seal performance when used as a seal member to be inserted into a gap between the outer case 10 and the inner case 30. Accordingly, polypropylene is suitable as a sheet member. However, material is not limited to polypropylene, and any other materials can be employed as long as the they are the materials capable of being formed, having a small coefficient of friction and being elastic so as to function as a seal member for preventing fluid from leaking, such as the seal member 20 according to the present invention.

As illustrated in FIG. 4(a), the seal member 20 is formed by the pair of sheet members 21, and the pair of sheet members 21 is disposed at positions facing with each other. The seal member 20 is inserted into a gap between the inner peripheral surface 15b of the outer case body part 15 and the outer peripheral surface of the inner case 30. An external shape of a sheet body part 21d of the sheet member 21 is formed into a reverse conical trapezoid shape along the inner peripheral surface 15b of the outer case body part 15 and the outer peripheral surface of the inner case 30. In the present embodiment, in order to prevent side end parts of the pair of sheet members 21 facing with each other from overlapping due to thermal expansion etc., a length of the sheet body part 21d in a circumferential direction is set so as to have a prescribed gap between the side end parts of the pair of sheet members 21, as illustrated in FIG. 4(a) when the pair of sheet members 21 is disposed along a gap between the inner peripheral surface 15b of the outer case body part 15 and the outer peripheral surface of the inner case 30.

As illustrated in FIG. 4(c), a circular opening part 21a is provided at a central part of the each sheet body part 21d of the pair of sheet members 21. Also, a protruding ring 21c formed into a shape protruding outside along an outer periphery of the opening part 21a by embossing is provided. Further, a connection ring 21b forming a part of the sheet body part 21d is formed between the outer periphery of the opening part 21a and the protruding ring 21c. An opening diameter of the circular opening part 21a is substantially the same as or slightly larger than the opening diameters of the inflow opening part 32b and the outflow opening part 32c of the penetration pipe 32 in the inner case 30, and thus the sheet member 21 does not prevent a flow of the fluid flowing through the flowmeter 1 in a state where the sheet member 21 is assembled by inserting into a gap between the outer case 10 and the inner case 30.

Figure 5A:
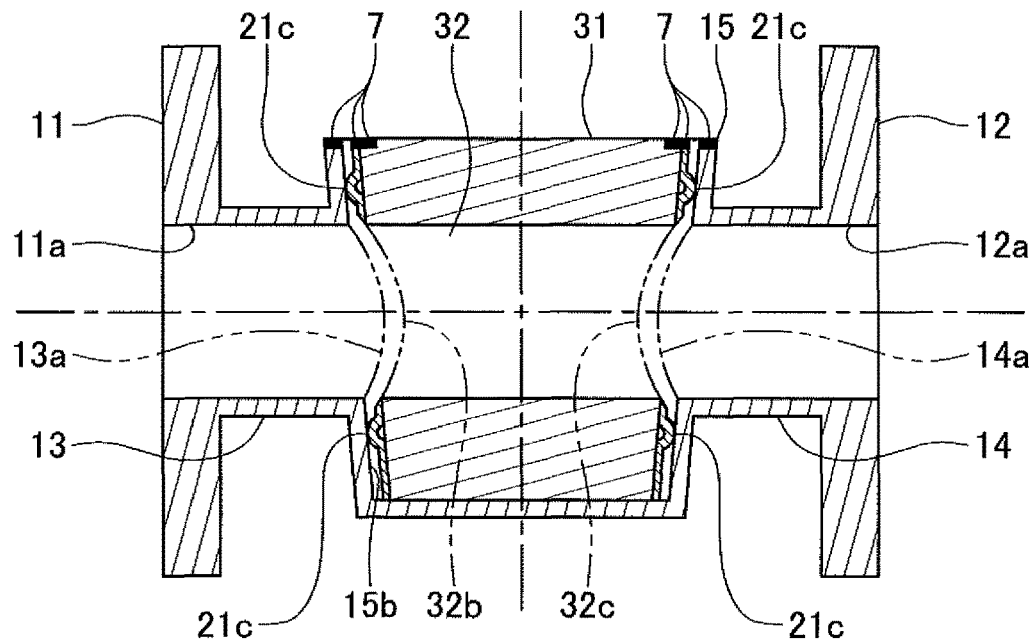
FIG. 5(A) is a cross sectional view seen from the front when cut in the perpendicular direction and includes a shaft of a pipe through which fluid flows in a state where the flowmeter according to the embodiment of the present invention is assembled.
Figure 5B:
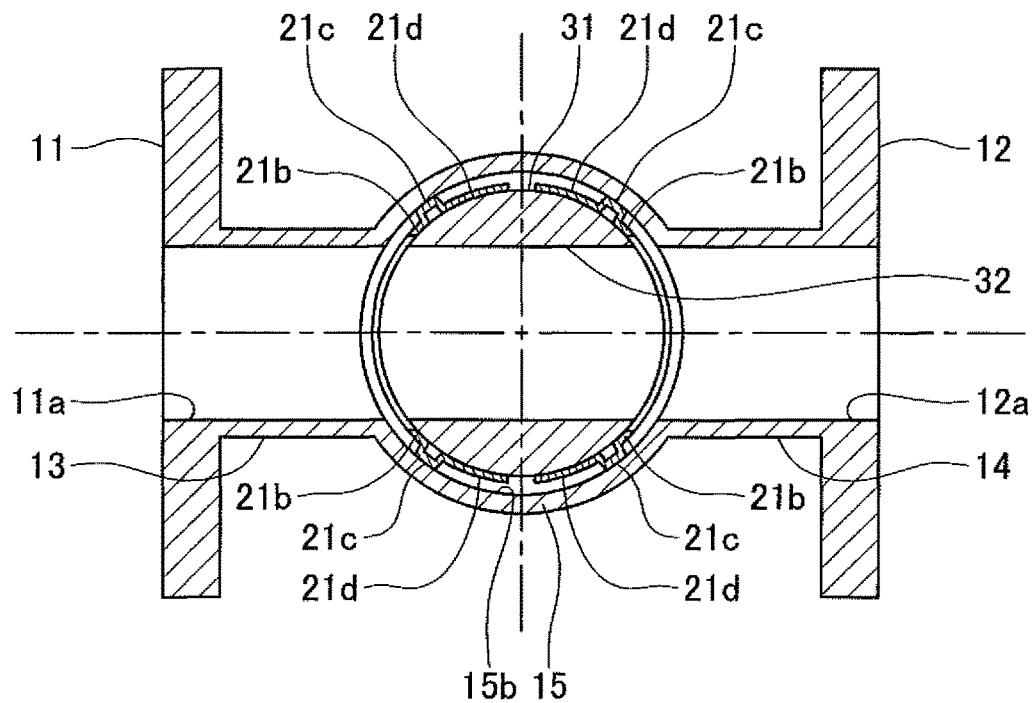
FIG. 5(B) is a cross sectional view seen from the plane when cut in the horizontal direction and includes a shaft of a pipe through which fluid flows in a state where the flowmeter according to the embodiment of the present invention is assembled.

FIGS. 5(A) and 5(B) are two-view drawings including shafts of the connection pipes 13, 14 thorough which fluid flows in a state where the flowmeter 1 according to the embodiment of the present invention is assembled; and more specifically (a) a cross sectional view seen from the front when cut in the perpendicular direction; (b) a cross sectional view seen from the plane when cut in the horizontal direction. The flowmeter 1 is assembled by inserting the inner case 30 into the outer case body part 15 in a state where the seal member 20 is attached along the outer peripheral surface of the inner case 30. Since the outer peripheral surface of the inner case 30 has a reverse conical trapezoid in the same shape as the inner peripheral surface 15b of the outer case body part 15 whose inclination surface is at the same angle as the inner peripheral surface 15b of the outer case body part 15, the inner case 30 can be smoothly inserted into the outer case body part 15. In addition, since the inner case 30 is inserted into the outer case body part 15 in a state where the seal member 20 employing the polypropylene having the small coefficient of friction and smoothly sliding is attached to the outer peripheral surface of the inner case 30, the inner case 30 can be smoothly inserted into the outer case body part 15. As illustrated in FIGS. 5(A) and 5(B) the flowmeter 1 is assembled so that the inflow opening part 11a and the outflow opening part 12a of the outer case 10, the inflow opening part 32b and the outflow opening part 32c of the penetration pipe 32 in the inner case 30, and the each circular opening part 21a of the pair of sheet members 21 of the seal member 20 are disposed on the same line along the flow of the fluid.

As illustrated in FIGS. 5(A) and 5(B), in a state where the flowmeter 1 is assembled, the each sheet body part 21d of the pair of the sheet member 21 in the seal member 20 that was inserted into the gap between the inner peripheral surface 15b of the outer case body part 15 in the outer case 10 and the outer peripheral surface of the inner case 30 is pressed by the outer peripheral surface of the inner case 30, and a protrusion tip of the protruding ring 21c in the sheet member 21 is pressed by the inner peripheral surface 15b of the outer case body part 15. That is, the gap between the inflow opening part 13a of the outer case body part 15 and the inflow opening part 32b of the penetration pipe 32 in the inner case 30 is sealed by the seal member 20, and the gap between the outflow opening part 14a of the outer case body part 15 and the outflow opening part 32c of the penetration pipe 32 in the inner case 30 is also sealed by the seal member 20.

As described above, in the flowmeter 1 according to the present embodiment, since it is not necessary to create a structure for holding the seal member 20 as disclosed in the Patent Document 1 in the inner case 30, a structure of the inner case 30 is prevented from becoming complicated, and thus the cost can be reduced. Also, in the flowmeter 1 according to the present embodiment, since the seal member 20 seals the gap between the outer case and the inner case by forming polypropylene having a thin thickness by embossing to form the protruding ring 21c and deforming the protrusion tip of the protruding ring 21c, the seal part of the lip seal is not crushed and deformed as disclosed in the Patent Document 1. Accordingly, even if the opening though which fluid flows has a large diameter, the flowmeter 1 can be easily assembled.

In the flowmeter 1 according to the present embodiment, as illustrated in FIG. 5(A), a length of the seal member 20 in the vertical direction (height) is set so that the upper end part of the seal member 20 is located at substantially the same position as the upper end part of the outer case body part 15 in the outer case 10 and the upper end part of the inner case body part 31 in the inner case 30 in a state where the seal member 20 and the inner case 30 are assembled into the outer case body part 15 of the outer case 10. Thus, it is possible to visually confirm whether the seal member 20 is disposed at an appropriate position.

Further, each positioning mark 7 is provided at the upper end part of the outer case body part 15 in the outer case 10, the upper end part of the seal member 20, and the upper end part of the inner case 30 (see FIGS. 1 and 5(A)). A position of the flow path provided at each part and through which the gas or the liquid flows is located on the same line along the flow of the fluid by assembling the seal member 20 and the inner case 30 into the outer case 10 in accordance with positions of the each positioning mark 7. Thus, the outer case body part 15, the seal member 20, and the inner case 30 can be easily assembled into each other at a correct position.

Figure 6:
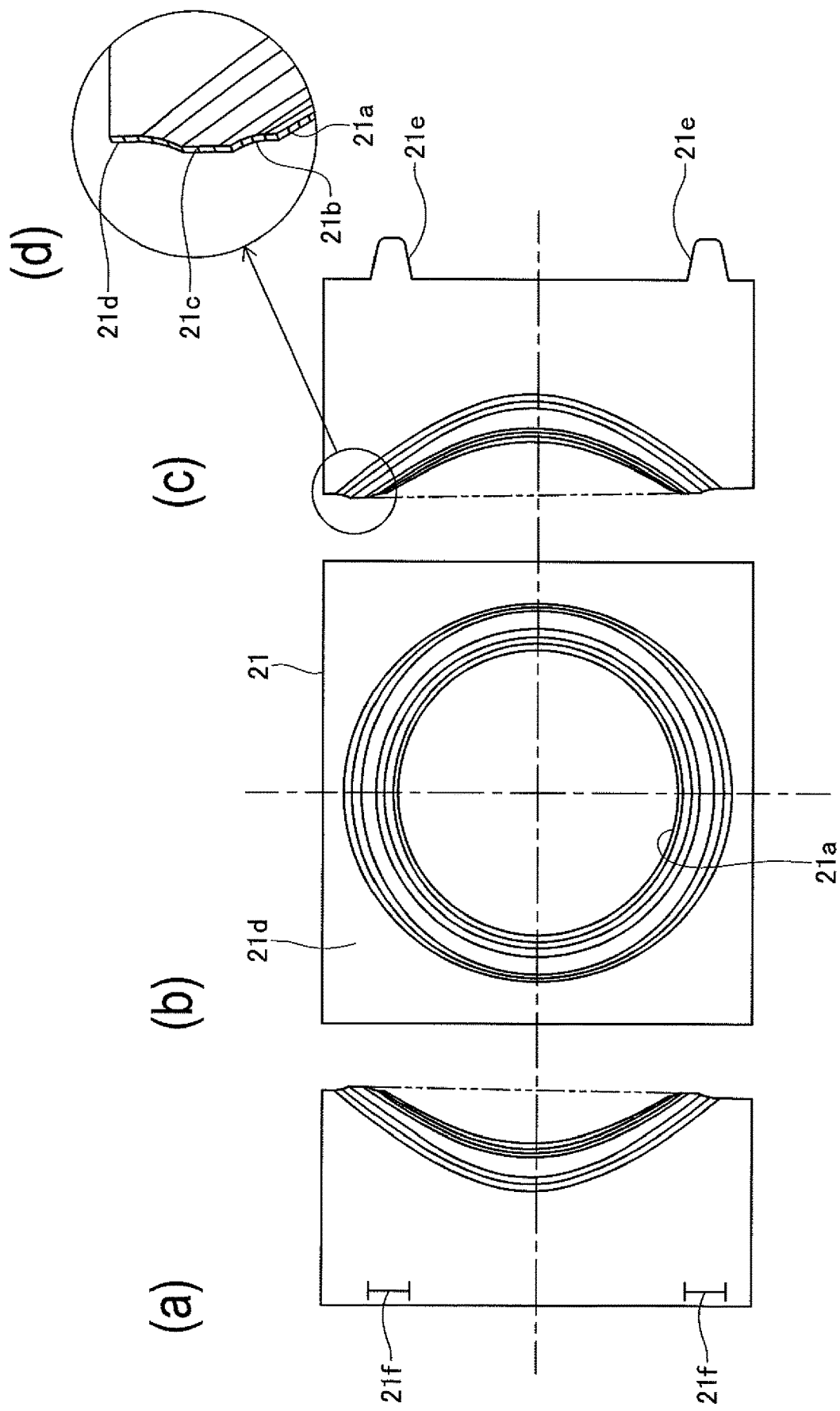
FIG. 6 is a four-view detailed drawing illustrating the sheet member of the flowmeter according to the embodiment of the present invention; i.e. (a) a left side view, (b) a front view, and (c) a right side view, and (d) a partly enlarged view.
Figure 7:
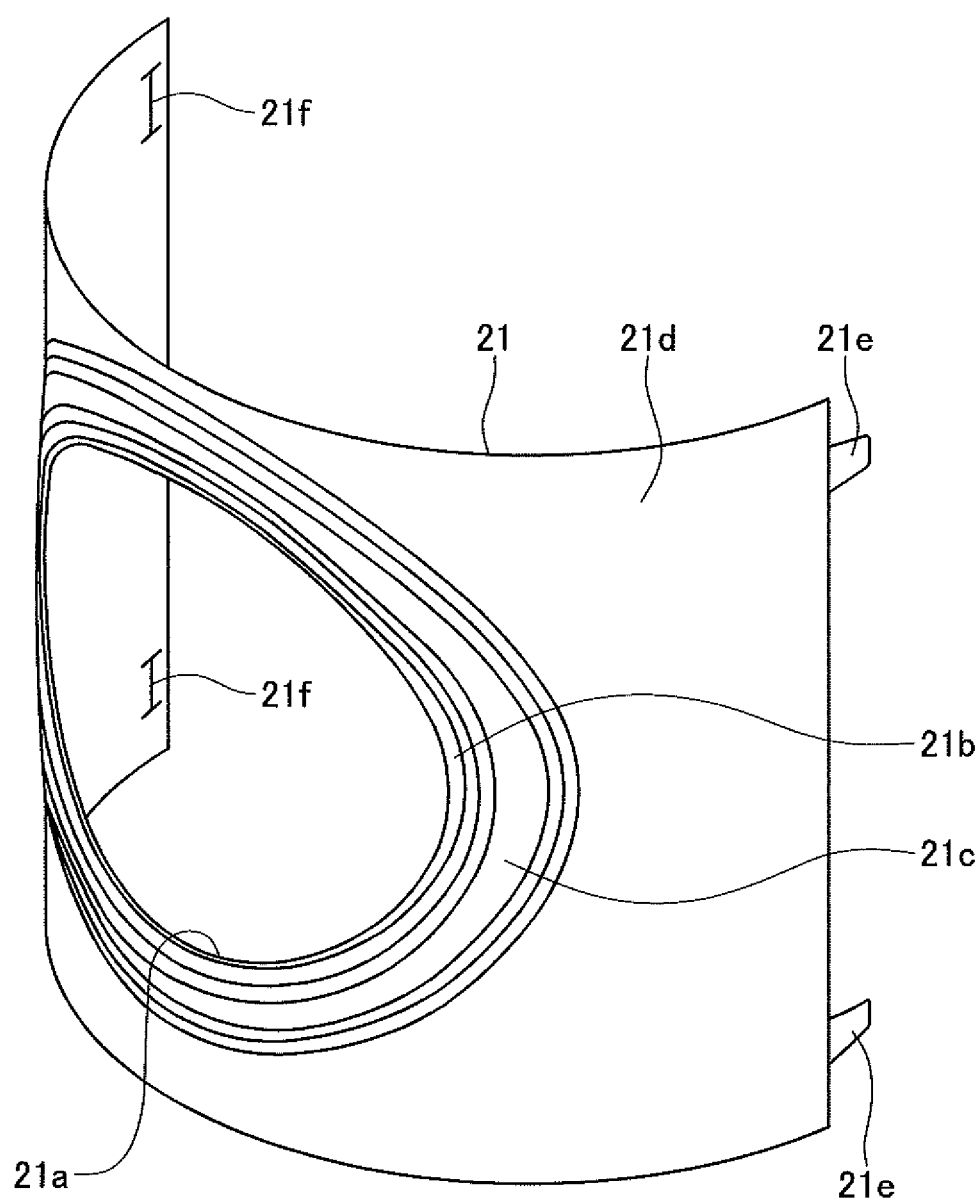
FIG. 7 is a perspective view of the sheet member illustrated in FIG. 6.
Figure 8:
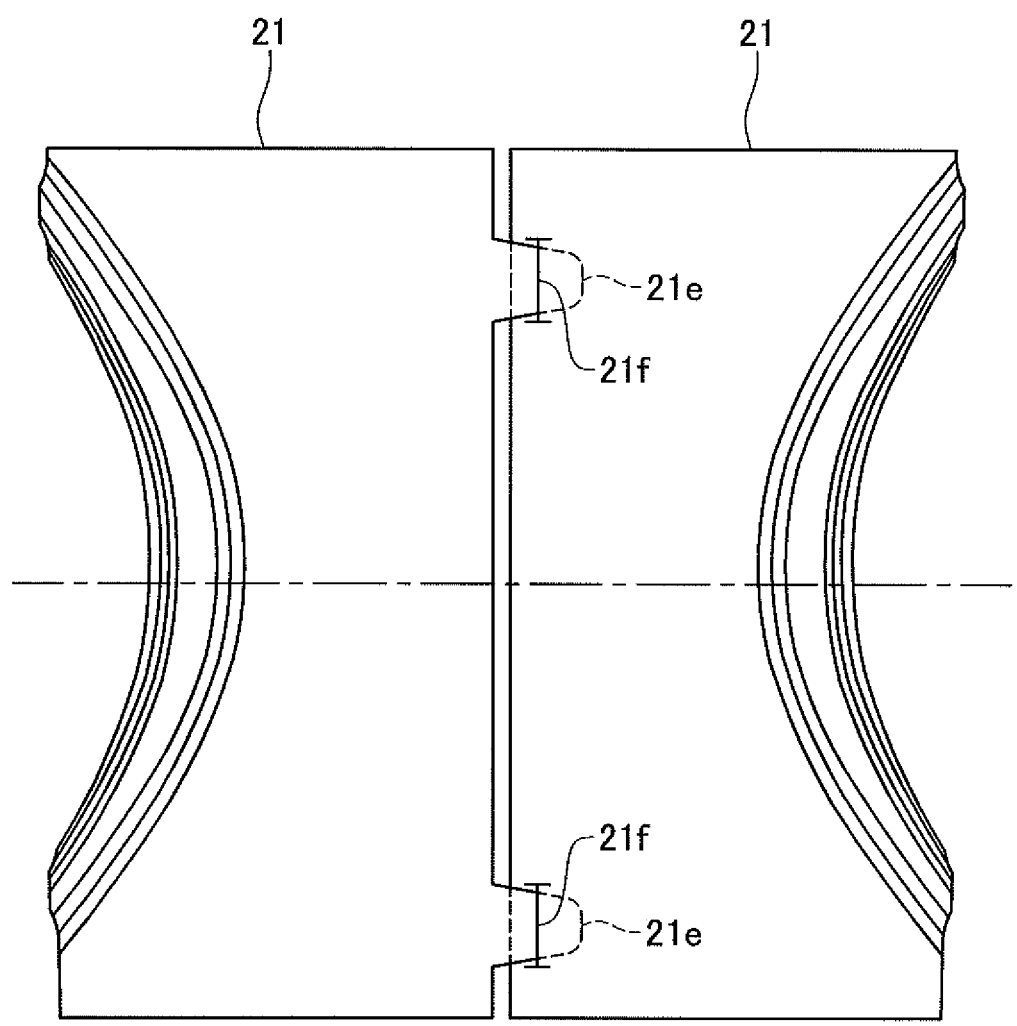
FIG. 8 is a front view illustrating a state where the two sheet members illustrated in FIG. 6 are assembled to each other.

FIG. 6 is a detailed view of the sheet member 21 of the seal member 20 according to the present embodiment, and FIG. 7 is a perspective view of the sheet member 21 in FIG. 6 seen from diagonally above. FIG. 8 is side view in a state where the pair of sheet members 21 is assembled to each other. FIG. 6(d) is a partly enlarged view of the protruding ring 21c in the sheet member 21. Thus, the protruding ring 21c is formed by embossing so as to protrude outside with respect to the sheet body part 21d of the sheet member 21. As illustrated in FIG. 6(c), each claw part 21e is provided at an upper position and a lower position of a right side end of the sheet member 21, and as illustrated in FIG. 6(a), an insertion port 21f for inserting the claw part 21e is provided at a left side end of the sheet member 21. As illustrated in FIG. 8, when the pair of the sheet members 21 is assembled to each other, the pair of sheet members 21 can be integrated by inserting the claw part 21e of the sheet member 21 provided at one side into the insertion port 21f of the sheet member 21 provided at the other side. The outer case 10, the seal member 20, and the inner case 30 can be easily assembled to each other with the above structure.

FIG. 9 is a detailed view illustrating a sheet member 41, i.e. another example of the above embodiment. As illustrated in an enlarged view of FIG. 9(d), in the sheet member 41, a recessed ring 41c recessed inside with respect to the sheet body part 41d is formed by embossing. In this case, contrary to the above embodiment, the sheet body part 41d is pressed by the inner peripheral surface of the outer case body part 15, and the recessed ring 41c is pressed by the outer peripheral surface of the inner case 30 to seal the gap between the outer case body part 15 and the inner case 30 by the sheet member 41 in a state where the inner case 30 is assembled into the outer case body part 15. Thus, the recessed ring 41c can obtain the same effect as the above embodiment instead of the protruding ring 21c.

The flowmeter 1 is one example of a flowmeter, the outer case 10 is one example of an outer case, the seal member 20 is one example of a seal member, the inner case 30 is one example of an inner case, the sheet members 21 and 41 are one example of a sheet member, the protruding ring 21c is one example of a protruding ring part, the recessed ring 41c is one example of a recessed ring part, the claw part 21e is one example of a claw part, and the insertion port 21f is one example of a cut. Also, the penetration pipe 32 is one example of a penetration pipe of an inner case. The opening part 21a of the seal member 20 is one example of an opening part of a seal member, the sheet body part 21d is one example of a side wall surface of a seal member, and the inner peripheral surface 15b of the outer case body part 15 is one example of an inner side surface of an outer case.

Although the present invention has been described in detail as described above, these are purely one embodiment, and thus the present invention is not limited to the above embodiments based on the specific description on the embodiments, the present invention can be performed with a variety of modifications and improvements based on the knowledge of the person skilled in the art. Also, it should be understood that the above embodiments are included within a range of the present invention as long as the above embodiments do not depart from the spirit of the present invention.

In the above embodiment, although the seal member 20 is formed by the pair of sheet members 21 in order to reduce the manufacturing cost by downsizing a molding die, the seal member 20 is not limited to the above technical feature, the seal member 20 may be one sheet shape wherein the pair of the sheet members 21 is connected with each other.

In the above embodiment, although the inner peripheral surface 15b of the outer case body part 15 in the outer case 10 and the outer peripheral surface of the inner case 30 are directed downward to incline inside so that the seal member 20 and the inner case 30 are easily taken out/assembled from/into the outer case body part 15 during maintenance of the flowmeter 1, the inclination is not always necessary. The inner case can be smoothly assembled/taken out into/from the outer case with the sheet member interposed therebetween without the inclination by employing a material having a small coefficient of friction and sliding smoothly such as polypropylene for the seal member 20.

In the above embodiment, although the length of the seal member 20 in the vertical direction (height) is set so that the position of the upper end part of the seal member 20, the position of the upper end part of the outer case body part 15 in the outer case 10, and the position of the upper end part of the inner case body part 31 in the inner case 30 are substantially the same in a state where the seal member 20 and the inner case 30 are assembled into the outer case body part 15 of the outer case 10, the length of the seal member 20 in the vertical direction is not limited to the above. The protruding ring 21c and the sheet body part 21d of the sheet member 21 may be pressed by the inner peripheral surface 15b of the outer case body part 15 and the outer peripheral surface of the inner case 30, or the sheet body part 41d and the recessed ring 41c of the sheet member 41 may be pressed by the inner peripheral surface 15b of the outer case body part 15 and the outer peripheral surface of the inner case 30 in a state where the seal member 20 and the inner case 30 are assembled into the outer case body part 15 of the outer case 10, and thus the upper end part of the seal member 20 do not necessarily have to be disposed at substantially the same positions as the upper end part of the outer case body part 15 in the outer case 10 and the upper end part of the inner case body part 31 in the inner case 30.

Also, although it was described above that the outer case body part 15 of the outer case 10 is formed into a bottomed cup shape having the bottom part 15c, the present application is not limited to the bottomed cup shape. The outer case body part of the outer case may be formed into a shape having both end parts opened without a bottom part.

In the present embodiment, although it was described above that the diameter of the inner peripheral surface 32a of the penetration pipe 32 in the inner case 30 is substantially the same as the diameter of the inflow opening part 11a, the pipe inner diameters of the connection pipes 13, 14, and the diameter of the outflow opening part 12a in the outer case 10, and they are on the straight line at the same position, the present application is not limited to the above. It may be more appropriate based on the measurement principle that the diameter of the inner peripheral surface 32a of the penetration pipe 32 is larger/smaller than the diameter of the inflow opening part 11a, the pipe inner diameters of the connection pipes 13, 14, and the diameter of the outflow opening part 12a. Also, it may be more appropriate that the direction of the flow path is changed in the penetration pipe 32. Accordingly, the diameter of the inner peripheral surface 32a of the penetration pipe 32 and the penetration direction thereof are not limited to the present embodiment, and they are appropriately set.

REFERENCE SIGNS

1: flowmeter
7: positioning mark
10: outer case
11a, 13a, 32b: inflow opening part
12a, 14a, 32c: outflow opening part
15b: inner peripheral surface of an outer case body part 15
20: seal member
21, 41: sheet member
21a: opening part
21b: connection ring
21c: protruding ring
21d, 41d: sheet body part
21e: claw part
21f: insertion port
30: inner case
31: inner case body part
31c: upper end part of the inner case body part 31
41c: recessed ring

The invention claimed is:

1. A flowmeter including a leak prevention arrangement from a gap, the flowmeter comprising:
an outer case;
an inner case forming the gap by being loosely fitted into the outer case; and
a seal member to be inserted between the outer case and the inner case,
the seal member including:
an opening part located in a flow path passing through the outer case and the inner case; and
a protruding ring part or a recessed ring part respectively formed into a protruded shape or a recessed shape from a side wall surface of the seal member and enclosing the opening part in an outer periphery of the opening part, wherein:
a communicating part of the outer case and the inner case in the flow path is sealed when the protruding ring part or the recessed ring part of the seal member is interposed and pressed between the outer case and the inner case in a state where the inner case is assembled into the outer case via the seal member,
the outer case comprises an open end serving as an insertion port of the inner case at one end; a bottom part including a diameter that is slightly smaller than a diameter of the open end; and an opening communicating the flow path with the inner case on a side wall,
an inner side surface of the outer case is inclined inside from the open end toward an insertion direction of the inner case,
the inner case comprises an insertion rear, an insertion lip including a diameter that is slightly smaller than a diameter of the insertion rear, and a penetration pipe forming the flow path by communicating with the opening of the outer case and passing through a side part of the inner case, and
an outer side surface of the inner case is inclined inside from an insertion rear end toward the insertion tip with respect to the outer case at the same angle as an inclination provided on the inner side surface of the outer case.

2. The flowmeter according to claim 1, wherein the seal member is formed by a pair of sheet members divided for the each opening part.

3. The flowmeter according to claim 2, wherein each of the pair of sheet members is provided with a claw part protruding outside at one side end part and a cut into which the claw part is inserted at the other side end part, and wherein the claw part and the cut provided at one of the pair of sheet members are respectively inserted into the cut and the claw part provided at the other of the pair of sheet members to form the seal member.

4. The flowmeter according to claim 3, comprising a positioning mark provided at upper end parts of the outer case, the inner case, and the seal member to position the flow path and the opening part of the seal member when the inner case is assembled into the outer case via the seal member.

5. The flowmeter according to claim 2, comprising a positioning mark provided at upper end parts of the outer case, the inner case, and the seal member to position the flow path and the opening part of the seal member when the inner case is assembled into the outer case via the seal member.

6. The flowmeter according to claim 1, wherein an upper end of the seal member and upper ends of the outer case and the inner case are located at the same position in a state where the inner case is assembled into the outer case via the seal member.

7. The flowmeter according to claim 6, comprising a positioning mark provided at upper end parts of the outer case, the inner case, and the seal member to position the flow path and the opening part of the seal member when the inner case is assembled into the outer case via the seal member.

8. The flowmeter according to claim 1, comprising a positioning mark provided at upper end parts of the outer case, the inner case, and the seal member to position the flow path and the opening part of the seal member when the inner case is assembled into the outer case via the seal member.

9. The flowmeter according to claim 1, wherein the seal member is a sheet made of a resin, and the protruding ring part or the recessed ring part is formed by embossing.

* * * * *